United States Patent
Mullins et al.

(10) Patent No.: US 6,268,603 B1
(45) Date of Patent: Jul. 31, 2001

(54) METHOD AND APPARATUS FOR INTERPRETING FLUORESCENCE LOGGING DATA

(75) Inventors: Oliver C. Mullins, Ridgefield; Xu Wu, Danbury; Charles Flaum, Ridgefield, all of CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 09/204,447

(22) Filed: Dec. 3, 1998

Related U.S. Application Data (60) Provisional application No. 60/067,267, filed on Dec. 3, 1997.

(51) Int. Cl.[7] ........................................ G01V 8/02
(52) U.S. Cl. ........................................ 250/269.1
(58) Field of Search ........................................ 250/269.1

(56) References Cited

U.S. PATENT DOCUMENTS

| | | | |
|---|---|---|---|
| 2,206,922 | 7/1940 | Smith . | |
| 2,334,475 | 11/1943 | Claudet . | |
| 2,346,481 | 4/1944 | Garrison . | |
| 2,843,752 | * 7/1958 | Goodman | 250/268 |
| 4,609,821 | 9/1986 | Summers . | |
| 5,912,459 | * 6/1999 | Mullins et al. | 250/256 |

* cited by examiner

Primary Examiner—Constantine Hannaher
(74) Attorney, Agent, or Firm—Erica W. Kuo; William B. Batzer (57) ABSTRACT

Methods and apparatuses for investigating formations surrounding a borehole involve acquiring a fluorescent signal over a portion of the borehole and analyzing the signal to detect the presence of crude oil. Analyzing the signal to detect the presence of crude oil may involve distinguishing mineral fluorescence from oil fluorescence. The signal may be analyzed further to distinguish characteristics of the crude oil, such as its grade (light, medium or heavy), and to indicate a physical property correlated with the fluorescence, such as the presence of laminations or formation permeability. In some embodiments, fluorescence signals from illuminating the portion of the borehole with at least two different wavelengths of light are analyzed.

22 Claims, 7 Drawing Sheets

METHOD AND APPARATUS FOR INTERPRETING FLUORESCENCE LOGGING DATA

CROSS-REFERENCE TO RELATED APPLICATIONS

The present application claims priority of U.S. provisional patent application Ser. No. 60/067,267, filed Dec. 3, 1997 and INCORPORATED HEREIN BY REFERENCE.

The present application is related to U.S. Pat. No. 5,912,459, issued Jun. 15, 1999 from U.S. patent application Ser. No. 08/873,849, filed Jun. 13, 1997, which is a continuation of U.S. patent application Ser. No. 08/445,121, filed May 19, 1995, now U.S. Pat. No. 6,140,637, which is a continuation of U.S. patent application Ser. No. 08/249,430, filed May 26, 1994 now abandoned. Also related to the present case is U.S. Pat. No. 5,517,024, issued May 14, 1996, which is a continuation-in-part of the '430 application. Applicants HEREBY INCORPORATE BY REFERENCE the '430, '121, and '849 applications, as well as the '024 patent.

FIELD OF THE INVENTION

The present invention relates generally to fluorescence logging of underground formations and, more particularly, to the methods and apparatus for the processing and/or interpretation of fluorescence logging data.

BACKGROUND OF THE INVENTION

Organic compounds, such as aromatic hydrocarbons, fluoresce when irradiated with electromagnetic radiation of certain wavelengths. The property of fluorescence, particularly in response to ultra-violet radiation, has been used for many years as the basis of a method of chemical analysis.

Fluorescence analysis has also been performed on cuttings or cores obtained during the drilling of wells to determine the presence of hydrocarbons in pore fluid. An example of such a technique can be found in U.S. Pat. No. 4,609,821. In techniques such as these, the cuttings or cores are cleaned to remove any drilling fluid products, which might otherwise interfere with the analysis, and the samples are crushed and extracted with a solvent, which is then analyzed. Alternatively, the sample is directly irradiated, and the fluorescence analyzed. While core-analysis techniques can provide reasonably accurate analysis of the core fluids, there are certain drawbacks. Cores are relatively expensive to obtain and must be returned to the surface for analysis. Also, since cores are only taken at specific locations, it is possible that a hydrocarbon-bearing formation can be missed. Cuttings are obtained continuously in drilling, but have the disadvantage that it is not possible to determine at the surface exactly where the cuttings originate downhole, making the identification of hydrocarbon-bearing formations difficult. Also, cuttings give no reliable indication of the extent of any hydrocarbon-bearing formations.

It has been proposed to use fluorescence of hydrocarbons for downhole evaluation of pore fluids with a wireline logging tool. U.S. Pat. No. 2,206,922 discloses a wireline tool which is lowered into a well and uses fluorescence in response to ultra-violet radiation to detect hydrocarbons. In one application, it is proposed to use the '922 tool to detect the presence of oil in drilling fluid as an indication of oil-bearing strata. In another application, it is proposed to bail drilling fluid from the well, and examine the borehole wall for oil.

Unfortunately, as would be readily apparent to a person skilled in the art, neither application is feasible in practice. In the first case, the presence of any fluorescent materials (such as oil) which are added to the drilling fluid masks fluorescence from any oil entering the borehole from the formation. (Only small amounts of oil will enter a borehole due to mud overpressure.) Also, oil entering the borehole from the formation becomes dispersed during drilling or migrates up the well due to its differing density to the drilling fluid. Therefore, this approach will not allow accurate identification of oil-bearing strata. In the second case, the option of removing drilling fluid from the well is not usually available and, in any case, even such fluid removal would not remove mudcake from the borehole wall, which itself will mask the underlying formations.

Thus, the '922 patent fails to disclose any method or apparatus which might conceivably work in an oil well drilled using current technology. In particular, there is no disclosure of a technique which could be used to reliably log the length of the well with any reasonable expectation of being able to identify hydrocarbon-bearing formations.

U.S. Pat. No. 2,346,481 proposes a fluorescence logging tool which can be lowered into a well and logged to identify oil-bearing strata. In this case, the tool includes an ultra-violet light source. A transparent bar of quartz projects from the light source and is maintained in contact with the borehole wall. A further quartz bar is provided to direct the fluorescence to a film recorder as the tool is logged through the borehole. While the '481 patent appears to address some of the problems associated with the approach described in the earlier '922, the '481 system would still fail to function as described or intended—and persons skilled in the art would so recognize. In order to examine the borehole wall using the '481 device, it would be necessary for the quartz rods to penetrate the mudcake surrounding the wall. However, the force which must be applied to the quartz bar to ensure such contact would cause the bars to fail mechanically. Moreover, even in the absence of significant mudcake, the mere action of logging the '481 tool through a borehole would likely cause mechanical failure of the quartz bars. Therefore, the approach set forth in U.S. Pat. No. 2,236,481 is also inoperable.

U.S. Pat. No. 2,334,475 also discloses a fluorescence logging tool for detecting petroleum in situ. The tool includes an ultraviolet source which illuminates the rock through a quartz window and detects fluorescence through the same window. The window is suggested as being glass or quartz and, in one case, is housed in a mounting which includes portions for cutting through the mudcake on the borehole wall. It is suggested that quartz be selected as a material which is sufficiently resistant to withstand the friction of the borehole wall during the logging application and that the window project from its housing to come into direct contact with the borehole wall. However, as a person skilled in the art would recognize, quartz is not sufficiently strong to withstand the forces generated during logging, and will fail by fracturing. Thus, the '475 device also is inoperable and, in all likelihood, would not withstand more than a few feet of logging before tool failure.

Additionally, beyond the initial act of creating a fluorescence log, there remains the question of how to extract useful information from the log. The prior art merely suggests that fluorescence data can be used to ascertain the presence or absence of hydrocarbons leaching from the formations into the borehole. However, interpreting a fluorescence log to ascertain the presence of oil (or other geological feature(s) of interest) is a non-trivial problem.

U.S. Pat. No. 5,656,810, incorporated herein by reference, describes the use of emission spectroscopy in the evaluation of crude oil samples (in the laboratory, not downhole).

Besides crude oils, applicants have discovered that a number of minerals fluoresce. For instance, many limestones and some oil shales also fluoresce and, as applicants have discovered, such mineral fluorescence is primarily attributable to the presence of hydrocarbons in the rock.

Despite these similarities between oil and mineral fluorescence, experienced mud loggers can generally distinguish one from the other—based upon color, shape of the spot, and, if still in doubt, by solvent extraction. Unfortunately, none of these techniques is readily applicable to the downhole environment, especially the case of a continuous wireline log.

SUMMARY OF THE INVENTION

The present invention provides a method/apparatus for characterizing underground formations (and/or the fluids and gases therein) comprising placing a tool (hereinafter the Fluorescence Logging Tool or FLT) in a borehole, illuminating a portion of the borehole with light from one or more source(s) in the tool, detecting any fluorescent radiation with one or more detector(s) in the tool and analyzing the fluorescent radiation. In accordance with a further aspect of the invention, measured fluorescent radiation data may be compared and/or correlated with other well-logging or logging-while-drilling ("LWD") data to identify correspondences and/or relationships between the two, and/or to create models, rules, tables, or the like to assist in interpreting or otherwise using such fluorescence data in the future.

The method can also comprise moving the tool through the borehole while irradiating the formation and detecting fluorescence. Preferably, the borehole wall is illuminated and fluorescence detected through a window in the tool which is pressed against the borehole wall. The window is typically pressed against the borehole wall with sufficient force to displace any mudcake for a substantial time as the tool is moved through the borehole. This force is preferably such that the pressure applied at the window when in contact with the borehole wall is substantially greater than the overpressure of the fluid in the borehole. It is also preferred that the tool should be pressed against the borehole with sufficient force to cut into the surface of the rock, typically to a depth of the order of fractions of a millimeter in the porous rocks of interest, so as to reduce the effect of rugosity on the contact between the window and the rock.

The light source(s) can be visible, infrared or ultraviolet light or combinations of these. These light source(s) can include lamp(s), such as tungsten halogen lamp, LED(s) or laser diode(s).

In accordance with a still further aspect of the invention, the FLT tool may be conveyed through the borehole using cable, coiled tubing, drill pipe, or a robotic conveyance assembly.

BRIEF DESCRIPTION OF THE DRAWINGS

The present invention will now be described by way of example with reference to the accompanying drawings, in which.

DETAILED DESCRIPTION

Figure 1:
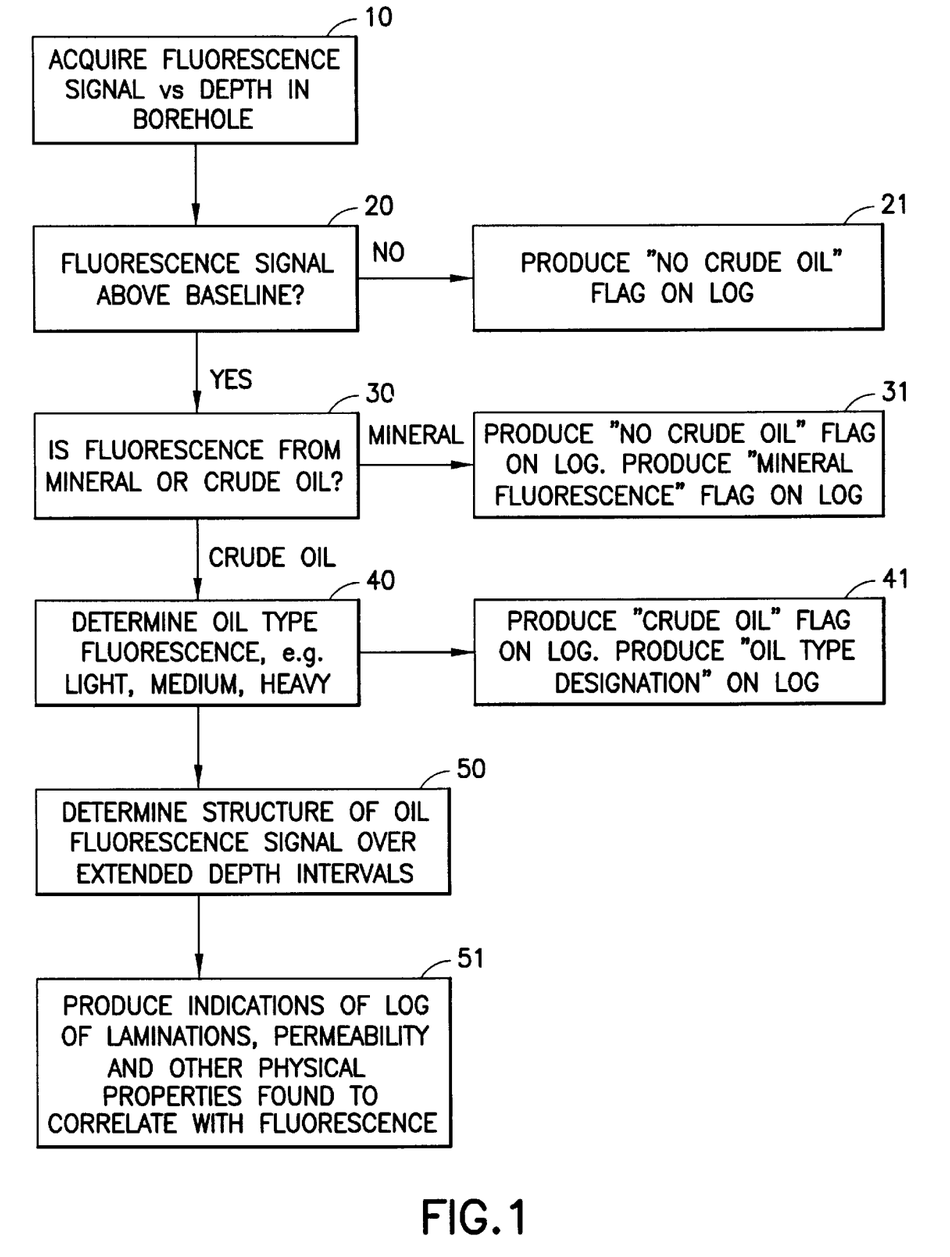
FIG. 1 is a flowchart.

Referring to FIG. 1, a fluorescence signal is acquired 10 using an FLT or other apparatus. The FLT preferably employs two excitation sources, each of different wavelengths, and two detectors, each having a different spectral response—although any number sources(s)/detector(s) is possible.

Still referring to FIG. 1, interpretation illustratively proceeds in several phases 20–50. Initially, the fluorescence signal is tested 20 to determine whether it is above baseline. If the signal is not above baseline, then no crude oil 21 is indicated. If, on the other, there is an above-baseline signal, then interpretation proceeds to 30, where analysis is performed to determine whether the detected fluorescence corresponds to mineral fluorescence or crude oil fluorescence. If mineral fluorescence is indicated, then it is also appropriate to indicate 31 an absence of crude oil. If, on the other hand, the fluorescence is from oil, then interpretation proceeds to 40, where a further analysis is made to type the detected crude oil. The typed oil is then reported in a familiar form—e.g., light, medium or heavy.

In addition to, instead of, or in parallel with, the above, one may also analyze 50 the structure of the fluorescence signal over an extended depth interval to determine, and report 51, indications of physical properties correlated with fluorescence—such as permeability of laminations.

Further details of the above analyses are discussed and exemplified in the incorporated '267 application.

Figure 2:
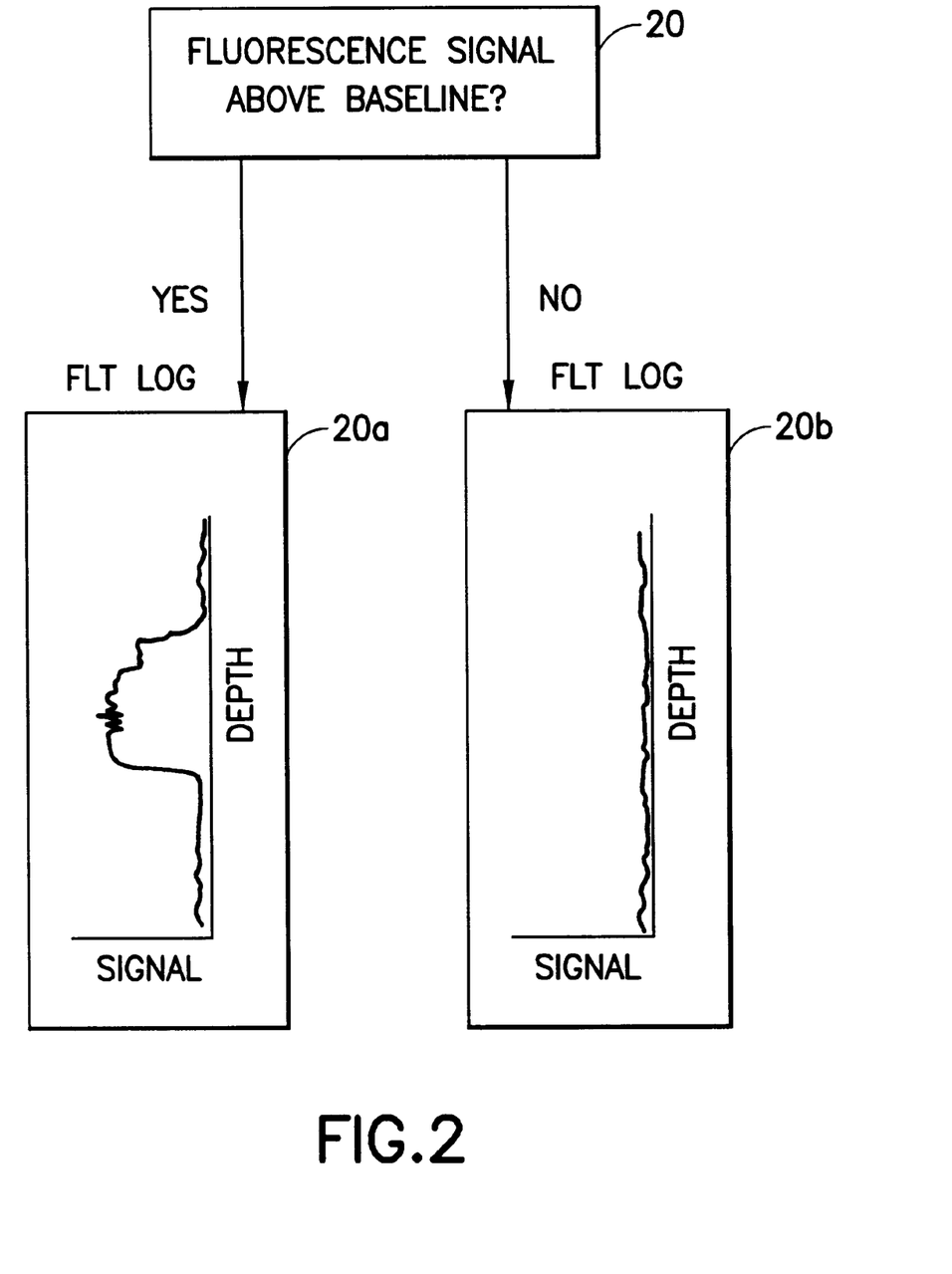
FIGS. 2–5 provide additional detail for various aspects of the FIG. 1 flowchart.

Referring to FIG. 2, examples are shown of a baseline fluorescence signal 20b and an above-baseline fluorescence signal 20a. As indicated, fluorescence intensity with a short wavelength source can be used to determine the presence or absence of crude oil.

Figure 3:
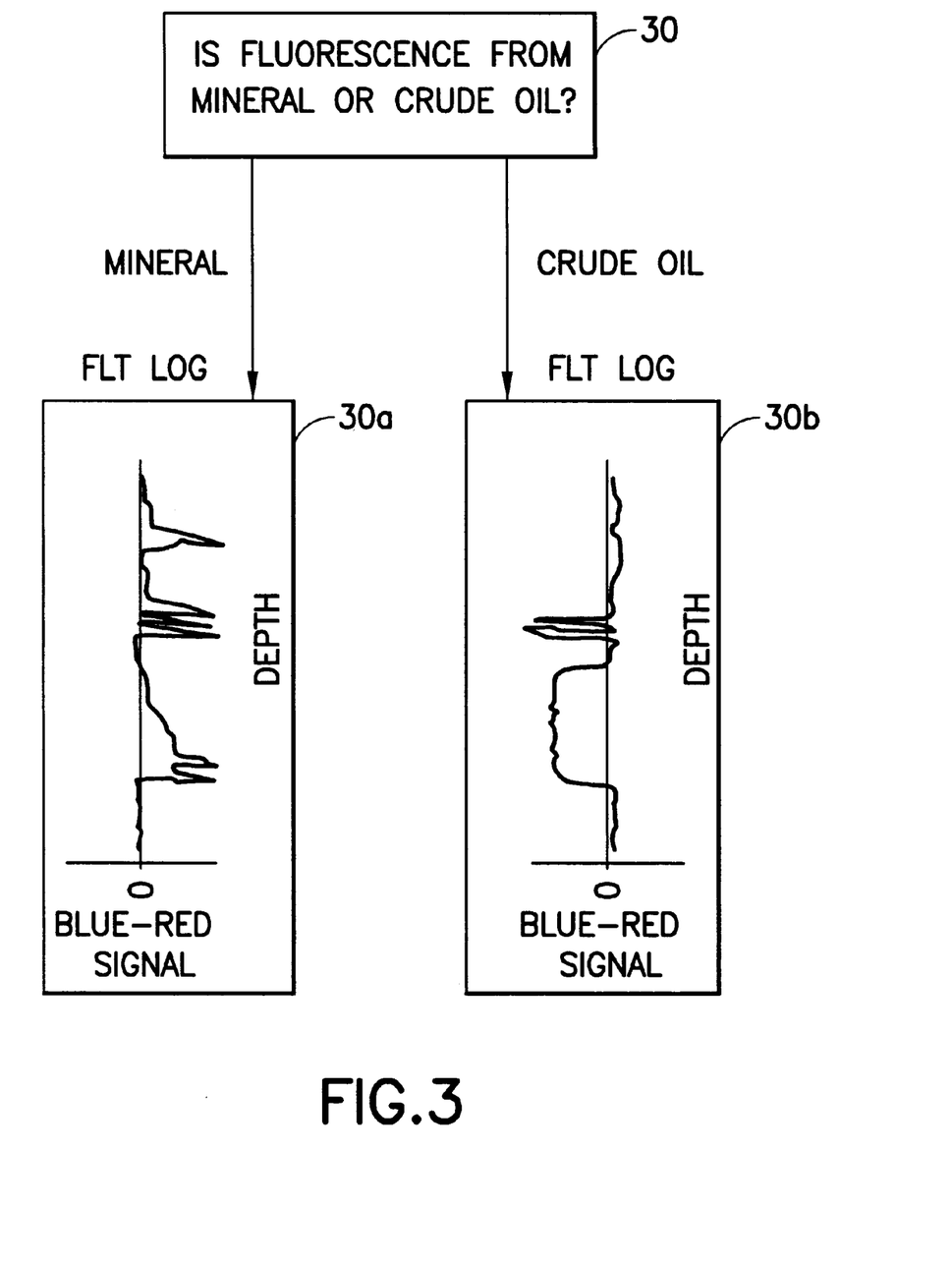

Referring to FIG. 3, examples are shown of mineral fluorescence 30a and crude oil fluorescence 30b. As indicated, differences of fluorescence intensity magnitudes excited by different sources, such as blue and red sources, can be used to differentiate mineral and crude oil fluorescence.

Figure 4:
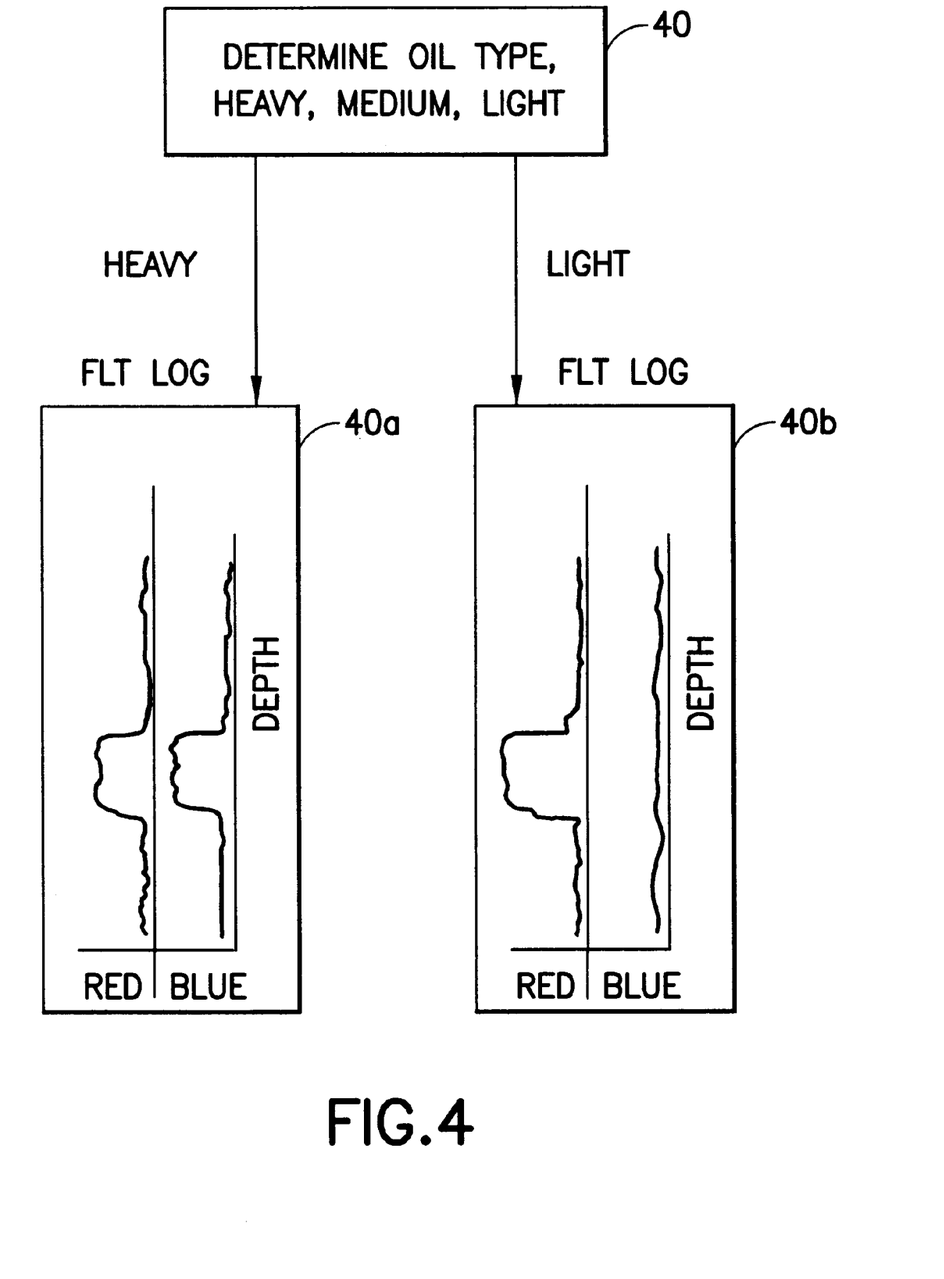

Referring to FIG. 4, exemplary fluorescence responses from heavy crude oil 40a and light crude oil 40b are shown. As indicated, difference, or, alternatively, a ratio, of fluorescence intensity magnitudes excited by different light sources, such as blue and red sources, can be used to differentiate light and heavy oils. Typically, light oils exhibit no fluorescence from red sources.

Figure 5:
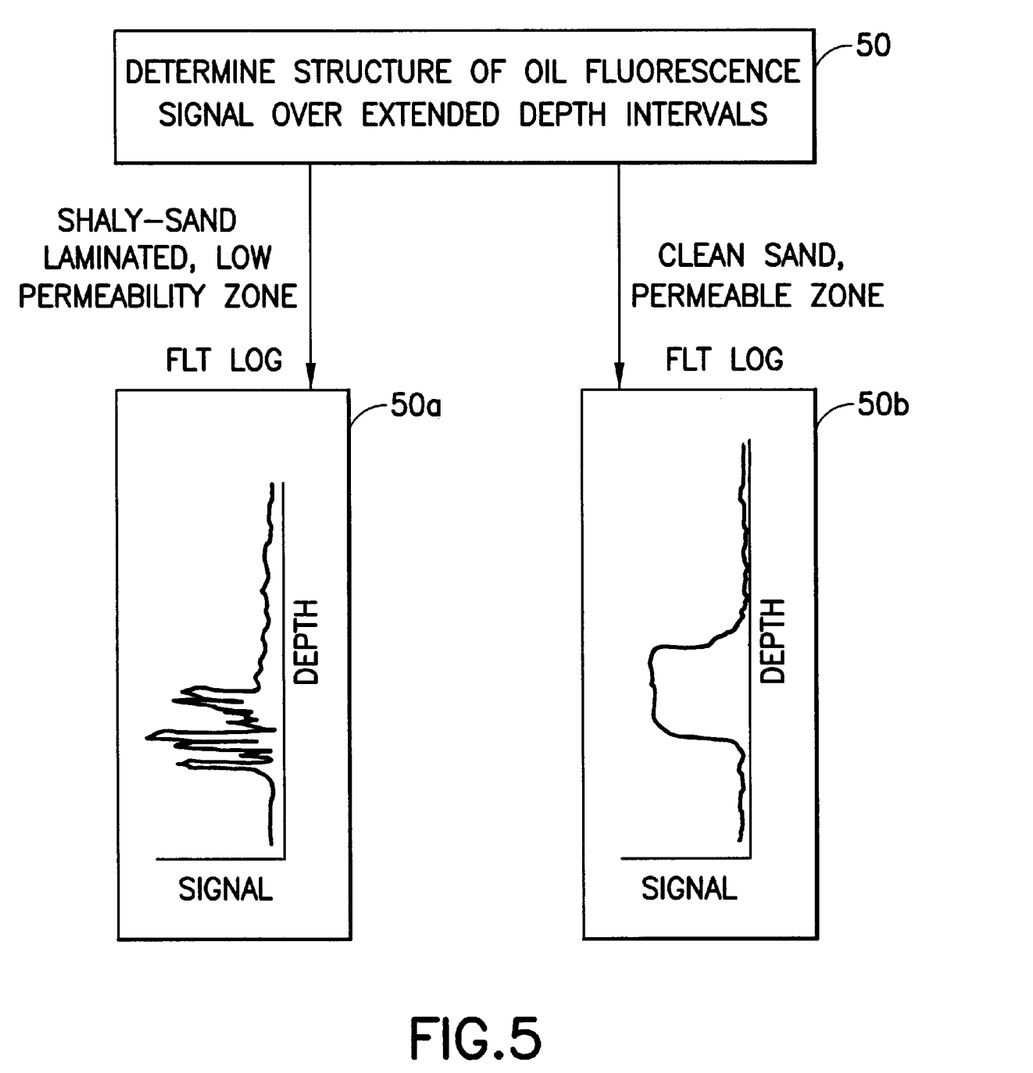

Referring to FIG. 5, exemplary fluorescence signatures for a shaly-sand laminated, low-permeability zone 50a and a clean sand, permeable zone 50b are shown. As indicated, the fluorescence signal structure (vs. depth in the borehole) is related to the structure of the oil-bearing zones. Most shales do not fluoresce, while oil-bearing sands do fluoresce.

Figure 6:
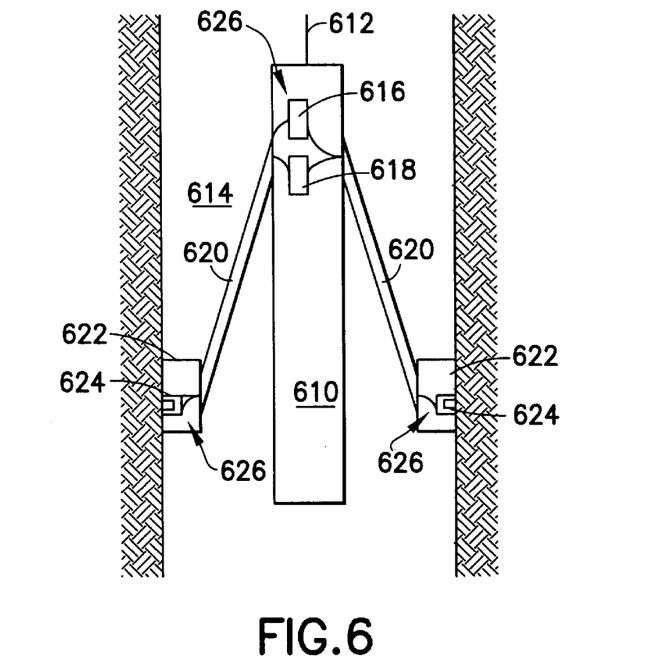
FIG. 6 shows a schematic view of one embodiment of a FLT.

FIG. 6 shows a schematic view of one embodiment of a FLT of the present invention. The tool comprises a tool body 610 which is suspended from a wireline cable 612 by which it can be lowered into a borehole 614. The tool body includes a light source 616 and a detector 618. A series of arms 620 (only two are shown) are pivotally connected to the tool body 610 and are urged outwardly from the tool body 610 by means of springs or hydraulic pressure such that the end of each arm 620 contacts the borehole wall. Each arm 620 carries at its outer end a pad 622 which includes an optical head 624 which contacts the borehole wall and is connected via an optical system 626 to the light source 616 and the detector 619. In an alternative embodiment, the source 616 and the detector 618 are also located in the pad 622. The wall is illuminated by light from the source 616 and fluorescence is detected at the detector 618 and communicated to the surface via the wireline cable 612. Because the position of the tool in the well can be determined from the length of cable withdrawn when returning the tool to the surface, the depths of the formations being scanned can be determined with a high degree of accuracy.

Figure 7:
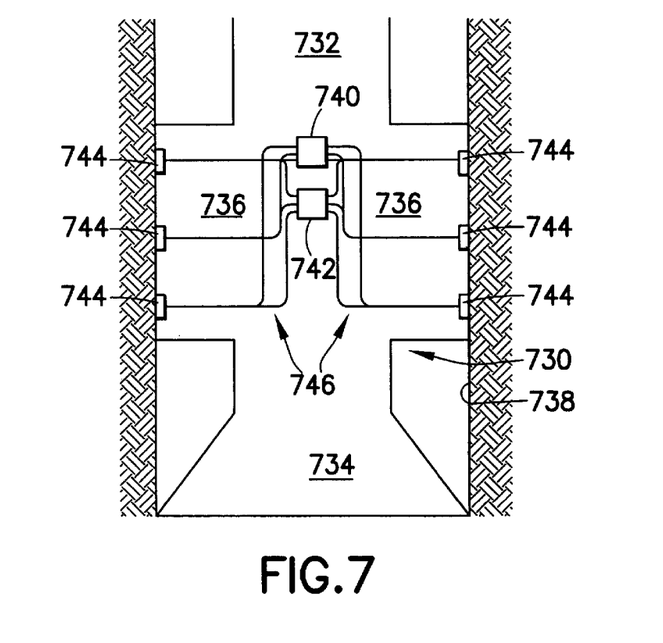
FIG. 7 shows a schematic view of another embodiment of a FLT.
Figure 8:
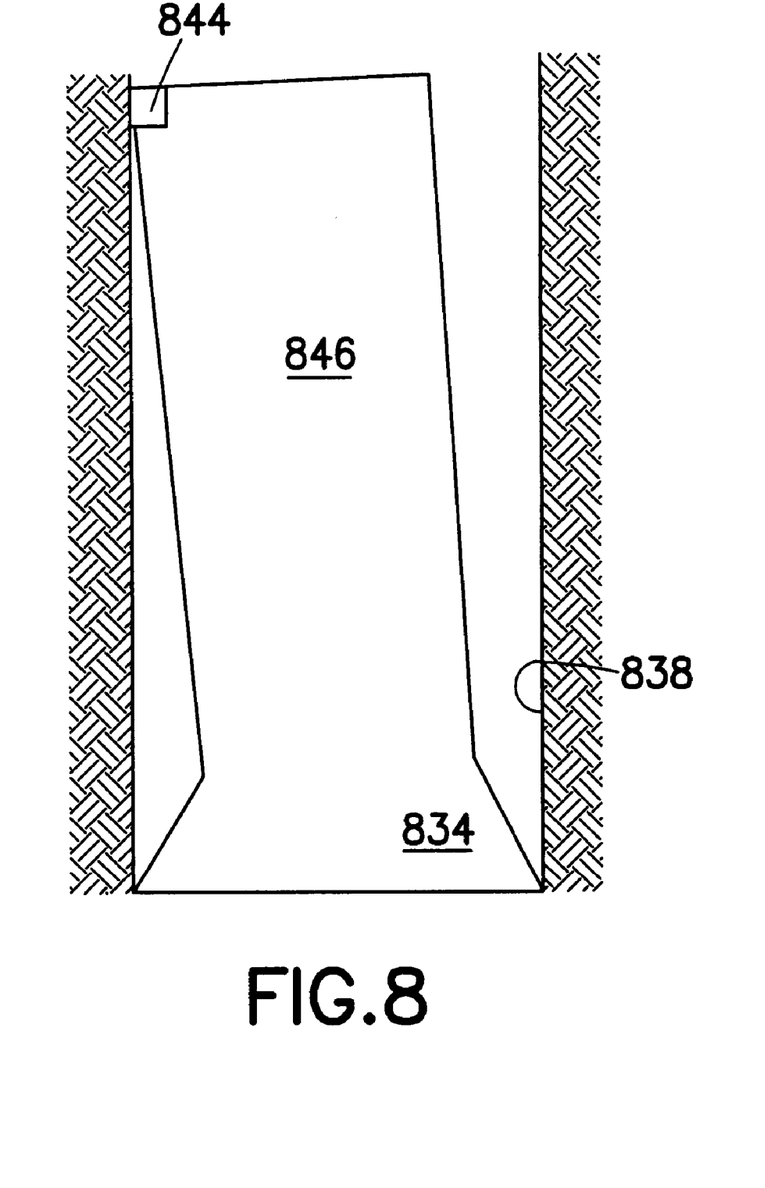
FIG. 8 shows a schematic view of still another embodiment of a FLT.

Alternative embodiments of a FLT of the present invention comprising logging-while-drilling (LWD) tools are shown in FIGS. 7 and 8. In these cases, the tools form part of the bottom hole assembly (BHA) which constitutes the lower end of a drill string used to drill a borehole. In FIG. 7, the tool body comprises a stabilizer 730 which is positioned in the BHA 732 close to the drill bit 734. A light source 740 and detector 742 are located in the BHA 732 and are connected to one or more optical heads 744 located in the stabilizer blades 736 by means of a fiber optic system 746. In the embodiment shown in FIG. 8, the stabilizer is absent and the optical heads 844 are located in the wall of a drill collar 846 forming part of the BHA. It will be appreciated that during drilling, the drill collar 846 will contact the wall of the borehole 838 from time to time and the optical head 844 will be held against the wall by the drill collar 846. Further embodiments have the optical head mounted at the bit of immediately behind the bit. In all of these cases, the fluorescence detected is communicated to the surface in the manner typical to LWD measurements which is well known.

The light source in the above embodiments can comprise a tungsten halogen lamp, e.g., $WI_2$ having a typical power of 10 W and producing light in the UV-visible-near IR with filtering being used to select the desired range, a blue LED having a focused power output of 3 mW and producing light of about 450 nm wavelength or a laser diode having a power of about 30 mW and producing light of about 674 nm wavelength. The detector is connected to suitable circuitry (not shown) such that information can be passed to the surface in an appropriate manner. In a further embodiment, multiple light source,s preferably two, are provided for light or differing wavelengths. Also multichannel detectors, or multiple detectors, can be provided for spectroscopic measurements.

While the foregoing has described and exemplified aspects of various embodiments of the present invention, those skilled in the art will recognize that alternative elements and techniques, and/or combinations and permutations of the described elements and techniques, can be substituted for, or added to, the embodiments and methods described herein. It is preferred, therefore, that the present invention not be defined by the specific apparatus, methods, and articles of manufacture described herein, but rather by the appended claims, which are intended to be construed in accordance with well-settled principles of claim construction, including, but not limited to, the following:

Limitations should not be read from the specification or drawings into the claims (e.g., if the claim calls for a "chair," and the specification and drawings show a rocking chair, the claim term "chair" should not be limited to a rocking chair, but rather should be construed to cover any type of "chair").

The words "comprising," "including," and "having" are always open-ended, irrespective of whether they appear as the primary transitional phrase of a claim, or as a transitional phrase within an element or sub-element of the claim (e.g., the claim "a widget comprising: A; B; and C" would be infringed by a device containing 2A's, B, and 3C's; also, the claim "a gizmo comprising: A; B, including X, Y, and Z; and C, having P and Q" would be infringed by a device containing 3A's, 2X's, 3Y's, Z, 6P's, and Q).

The indefinite articles "a" or "an" mean "one or more"; where, instead, a purely singular meaning is intended, a phrase such as "one," "only one," or "a single," will appear.

In a method claim, the order of steps is unimportant, unless the claim language specifically states that a given step must be performed before (or after) another. See Vaupel Textilmaschinen KG v. Meccanica Euro Italia s.p.a., 20 USPQ2d 1045, 1053 (Fed. Cir. 1991).

The step-plus-function provision of 35 U.S.C. 112, para. 6 does not apply to a limitation that recites an "act," rather than a "function" See Serrano v. Telular Corp., 42 USPQ2d 1538, 1542 (Fed. Cir. 1997). As used in the claims below, the verbs "acquire," "analyze," "determine," "distinguish," and "produce" are intended to describe acts, rather than functions or steps.

What is claimed is:

1. A method of investigating formations surrounding a borehole, comprising:
    (i) acquiring a fluorescence signal over a portion of said borehole;
    (ii) analyzing said signal to distinguish between mineral fluorescence and crude oil fluorescence to detect the presence of crude oil; and
    (iii) analyzing said crude oil fluorescence to determine whether said crude oil fluorescence corresponds to light, medium or heavy crude oil.

2. The method according to claim 1, further comprising:
    (iv) analyzing the structure of said fluorescence signal over an extended depth interval to produce an indication of a physical property correlated with fluorescence.

3. A method according to claim 2, wherein said physical property correlated with fluorescence is laminations.

4. A method according to claim 2, wherein said physical property correlated with fluorescence is permeability.

5. A method according to claim 1, wherein said fluorescence signal is acquired, in part, using two sources, of different wavelengths.

6. A method according to claim 5, wherein said fluorescence signal is acquired, in part, using two detectors, each having a different spectral response.

7. Apparatus for investigating formations surrounding a borehole, comprising:
    (i) means for acquiring a fluorescence signal over a portion of said borehole;
    (ii) means for analyzing said signal to distinguish between mineral fluorescence and crude oil fluorescence to detect the presence of crude oil; and
    (iii) means for analyzing said crude oil fluorescence to determine whether said crude oil fluorescence corresponds to light, medium or heavy crude oil.

8. Apparatus according to claim 7, further comprising:
    (iv) means for analyzing the structure of said fluorescence signal over an extended depth interval to produce an indication of a physical property correlated with fluorescence.

9. Apparatus according to claim 8, wherein said physical property correlated with fluorescence is laminations.

10. Apparatus according to claim 8, wherein said physical property correlated with fluorescence is permeability.

11. A method according to claim 7, wherein said means for acquiring a fluorescence signal includes two sources, of different wavelengths.

12. A method according to claim 11, wherein said means for acquiring a fluorescence signal includes two detectors, each having a different spectral response.

13. A method of investigating formations surrounding a borehole, comprising:
   (i) illuminating a portion of said borehole wall with light having a first wavelength and acquiring a first fluorescence signal in response to illuminating with the first wavelength;
   (ii) illuminating said portion of said borehole wall with light having a second wavelength, the second wavelength being different than the first wavelength, and acquiring a second fluorescence signal in response to illuminating with the second wavelength; and
   (iii) comparing said first and second fluorescence signals to detect the presence of crude oil in the formation.

14. The method according to claim 13, wherein (iii) comprises taking a difference between said first fluorescence signal and said second fluorescence signal.

15. The method according to claim 13, wherein (iii) comprises taking a ratio of said first fluorescence signal to said second fluorescence signal.

16. The method according to claim 13, wherein (iii) comprises distinguishing between mineral fluorescence and crude oil fluorescence.

17. The method according to claim 13, wherein (iii) further comprises determining a quality of the crude oil in the formation.

18. The method according to claim 17, wherein said quality of the crude oil is the grade of the oil.

19. The method according to claim 17, wherein (iii) comprises determining whether the crude oil corresponds to light crude oil or to heavy crude oil.

20. The method according to claim 13, wherein the first wavelength is a blue wavelength.

21. The method according to claim 20, wherein the second wavelength is a red wavelength.

22. Apparatus for investigating formations surrounding a borehole, comprising:
   (i) means for illuminating a portion of said borehole wall with light having a first wavelength and for acquiring a first fluorescence signal in response to illuminating with the first wavelength;
   (ii) means for illuminating said portion of said borehole wall with light having a second wavelength and for acquiring a second fluorescence signal in response to illuminating with the second wavelength; and
   (iii) means for comparing said first and said second fluorescence signals to detect the presence of crude oil in the formation.

* * * * *